M. SITNEY.
STEERING DEVICE FOR SHIPS.
APPLICATION FILED AUG. 7, 1916.
1,319,182.
Patented Oct. 21, 1919.
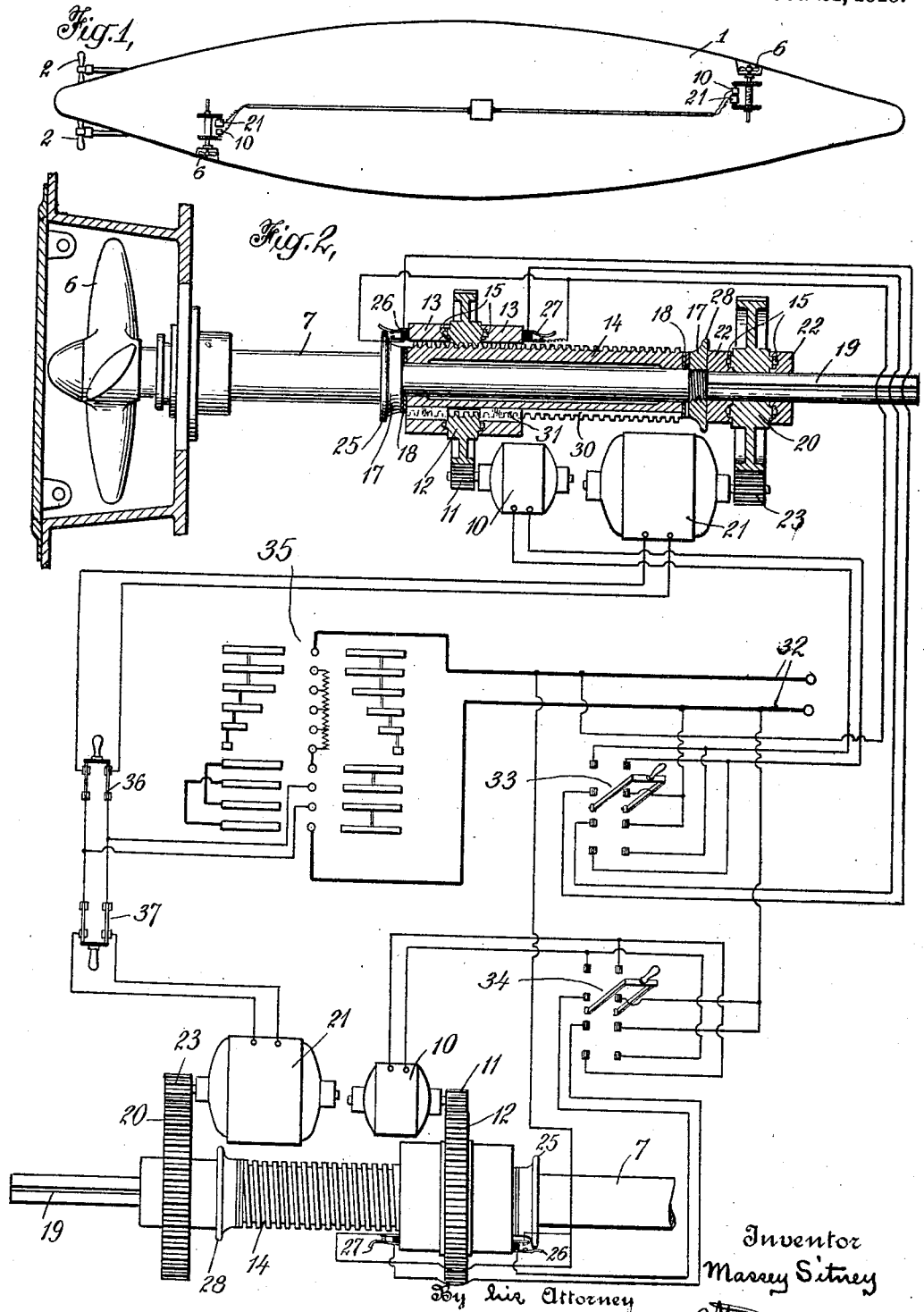
Inventor
Massey Sitney
By his Attorney

UNITED STATES PATENT OFFICE.

MASSEY SITNEY, OF BROOKLYN, NEW YORK.

STEERING DEVICE FOR SHIPS.

1,319,182.  Specification of Letters Patent.  Patented Oct. 21, 1919.

Application filed August 7, 1916. Serial No. 113,598.

*To all whom it may concern:*

Be it known that I, MASSEY SITNEY, a citizen of the United States of America, and a resident of Brooklyn, Kings county, and State of New York, have invented certain new and useful Improvements in Steering Devices for Ships, of which the following is a specification, reference being had to the accompanying drawing, forming a part thereof.

My invention relates to improvements in steering devices for ships and has for its object to provide means for turning a ship quickly around its vertical center line so as to avoid obstacles in its way or to make it more adaptable for offensive or defensive actions in case of warships.

A further object is to provide a ship having a driving propeller or propellers, in combination with steering propellers, having transverse shafts near the respective ends of the ship and a controller for concurrently operating the steering propellers as a couple on opposite sides of the ship so as to produce a very effective turning effort.

Other objects and advantages of my invention will be set forth hereinafter and I will describe the same with reference to the accompanying drawings and set forth the novel features thereof in appended claims.

In the drawings:

Figure 1 is a diagrammatic plan view of a ship equipped with the steering mechanism of my invention.

Fig. 2 is a partially sectional view of the steering mechanism drawn to a larger scale with the controller and circuit connections shown diagrammatically.

The ship illustrated comprises a hull 1, driving propellers 2 and steering propellers 6 which are moved into active positions by motors 10 and are actuated by motors 21.

The steering mechanisms are preferably located near the respective ends of the ship at a higher level than the main driving propellers with their shafts extending transversely.

Each of the mechanisms comprises a propeller 6, having a shaft 7, which is rotatively mounted within a sleeve 14. Collars 17 are secured to the shaft at the respective ends of the sleeve, washers 18 being interposed as clearly shown in Fig. 2. The inner end of the shaft 7 which extends beyond the sleeve 14 has a key way or slot 19 to coöperate with a suitable key in a driving gear 20. The gear is rotatively supported in stationary bearings 22 and is operatively connected to a driving motor 21 by pinion 23. The arrangement of parts is such that when the motor 21 is operated it drives the gear 20 and the shaft 7 without interfering with the longitudinal movement of the shaft.

The exterior of the sleeve 14 is screw-threaded to coöperate with a nut 12 and is supported in stationary bearings 13. The nut 12 is rotatively mounted between these bearings as clearly shown in Fig. 2, and is driven by a motor 10, operative connection being established by means of a pinion 11 which meshes with gear teeth on the periphery of the nut.

The sleeve 14 has a key-way or slot 30 to coöperate with keys 31 in the bearings 13 in order to prevent rotation of the sleeve and insure its longitudinal adjustment when the nut is turned.

Roller bearings 15 may be introduced between the nut 12 and the bearings 13 and gear 20 and bearings 22 if desired.

Switch actuating flanges 25 and 28 are provided on the respective collars 17 and are adapted to control limit switches 26 and 27 which are mounted on the stationary bearings 13. These are arranged to interrupt the circuit of the motor 10 at the respective ends of the travel of the propeller shaft in an axial direction.

The ship's sides are provided with recesses 3 in which the propellers are disposed when the steering mechanisms are not in use, each recess being provided with a sliding door 4 having projections 5 to which any suitable actuating means may be applied for opening and closing the door.

As shown in Fig. 2, the motors 10 for the two steering mechanisms are connected to a single circuit 32 and controlled respectively by switches 33 and 34. The motors 21 are also connected to the circuit 32 but are governed for concurrent operation by a controller 35. Switches 36 and 37 are provided for independently governing the motors 21 by making it possible to cut out either motor as desired.

The advantage of the invention however is the ability to operate not only the motors 10 simultaneously so as to bring both propellers into operative positions but also to actuate both of the motors 21 to operate the two propellers at once thereby producing a couple which effectively and very rapidly turns the ship about a central vertical axis. Furthermore, the four motors may be actuated at once so that the steering effect is obtained before the propellers reach their outside positions.

The steering mechanisms are operated as follows: first the sliding doors are opened (they preferably remain open when the ship is operating in dangerous waters), then the reversible motors 10 are set in operation, by closing the switches 33 and 34, and drive the nuts 12 so as to shift the propeller shafts axially and carry the propellers beyond the sides of the ship. The motors will continue to operate until the limit switches 27 are actuated to interrupt the motor circuit.

The reversible motors 21 are operated to drive the propellers in one direction or the other according to the direction in which the ship is to be turned, reversing controller 35 being used for this purpose.

After the steering or turning operation is completed the mechanisms may be returned to their initial positions by changing the positions of the switches 33 and 34 to reverse the motors 10 which will continue to operate in this direction until the limit switch members 26 are actuated to interrupt the circuit as shown in Fig. 2.

One of the advantages of my invention depends upon the fact that the steering may be effected whether the ship is in operation or at rest and the steering propellers are furthermore well adapted for nosing the ship in the vicinity of docks, or, in the case of a warship, various maneuvers may be accomplished.

It will be readily understood that both of the motors 10 and 21 can be started at once so as to effect a very quick turn for any purpose. This is particularly important on account of the speed at which modern ships are able to travel and consequently the great distances which may be covered before steering mechanisms hitherto known can be put into operation.

Various structural modifications may be effected within the spirit and scope of my invention and I intend that only such limitations be imposed as are indicated in the appended claims.

What I claim is:

1. In combination with a ship provided with recesses in its respective sides near its opposite ends, a steering mechanism in each recess comprising a propeller, a propeller shaft extending transversely of the ship, a longitudinally adjustable screw-threaded sleeve in which the shaft is rotatively supported, a rotatable nut coöperating with the threaded sleeve, an electric motor for actuating the nut to move the sleeve and the propeller shaft longitudinally, and a single switch for governing the motors to produce concurrent adjustment of the propellers.

2. In combination with a ship provided with recesses in its respective sides near its opposite ends, a steering mechanism in each recess comprising a propeller, a propeller shaft extending transversely of the ship, a longitudinally adjustable screw-threaded sleeve in which the shaft is rotatively supported, a rotatable nut coöperating with the threaded sleeve, an electric motor for actuating the nut to move the sleeve and the propeller shaft longitudinally, a single switch for governing the motors to produce concurrent adjustment of the propellers, and means for driving the propeller shafts without interfering with their longitudinal adjustments.

3. The combination of a ship having a driving propeller or propellers, a steering mechanism comprising a steering propeller, a shaft and a screw-threaded sleeve in which the shaft is rotatively supported, a rotatable nut coöperating with the threaded sleeve, a motor for actuating the nut to move the shaft axially, limit switches for stopping the motor when the propeller shaft approaches the end of its travel and a motor for driving a propeller without interfering with its longitudinal movement.

In testimony whereof, I have hereunto set my hand in the presence of two witnesses this 1st day of August 1916.

MASSEY SITNEY.

Witnesses:
ALBERT M. LEHMAN,
ALEXANDER LERMAN.

Copies of this patent may be obtained for five cents each, by addressing the "Commissioner of Patents, Washington, D. C."